G. O. RUND.
SMUT MACHINE.
APPLICATION FILED SEPT. 3, 1910.
1,027,906.
Patented May 28, 1912.
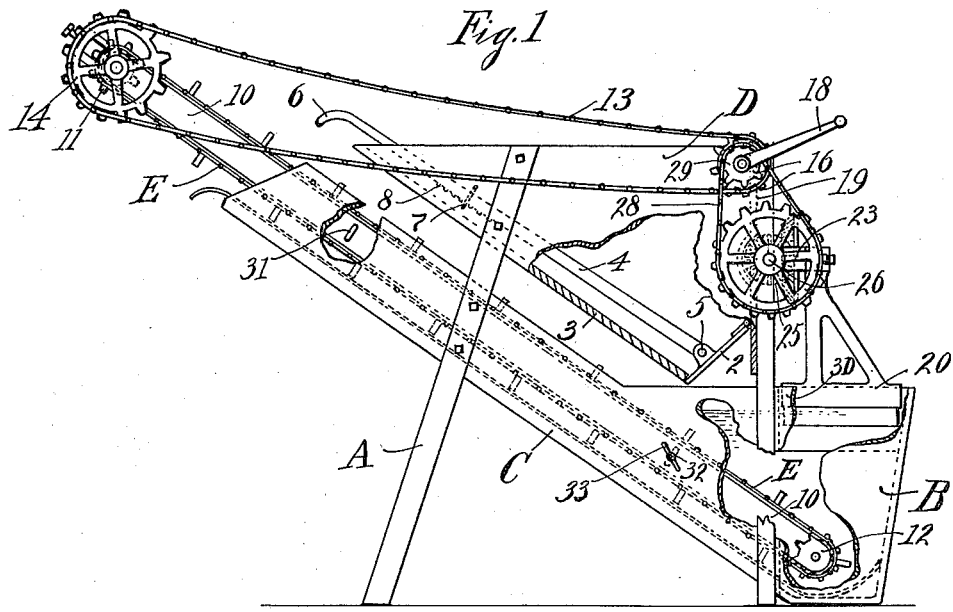
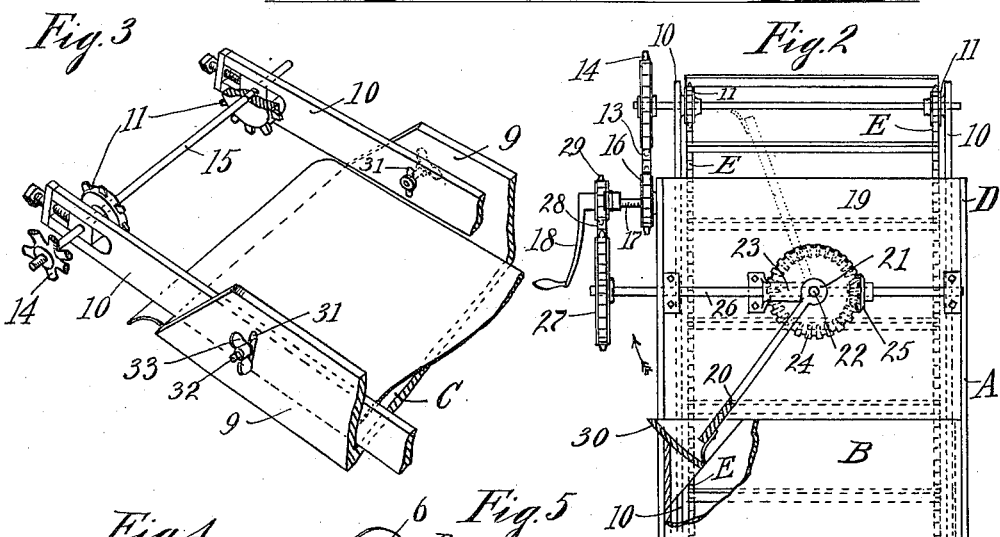
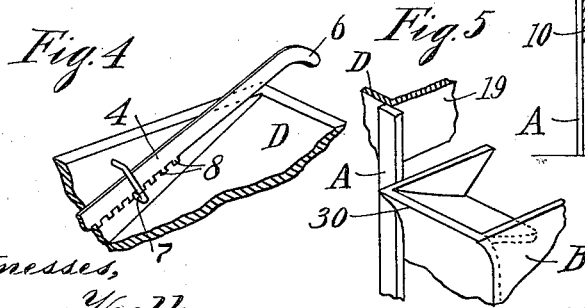
Witnesses,
George Voelker
H. Smith
Inventor;
Gustav O. Rund
by Lothrop & Johnson
his Attorneys.

UNITED STATES PATENT OFFICE.

GUSTAV O. RUND, OF CHRISTINE, NORTH DAKOTA.

SMUT-MACHINE.

1,027,906.     Specification of Letters Patent.     Patented May 28, 1912.

Application filed September 3, 1910. Serial No. 580,345.

*To all whom it may concern:*

Be it known that I, GUSTAV O. RUND, a citizen of the United States, residing at Christine, in the county of Richland and State of North Dakota, have invented certain new and useful Improvements in Smut-Machines, of which the following is a specification.

My invention relates to improvements in smut machines and has for its object to provide an improved machine, simple in construction and efficient in operation, for passing grain through a smut removing liquid.

To this end the invention consists in the features of construction, combination, and arrangement of parts hereinafter described and claimed.

In the accompanying drawings forming part of this specification, Figure 1 is a side view of the machine with some parts broken away; Fig. 2 is a front view of the same with some parts broken away and some in section to show the parts; Fig. 3 is a fragment in perspective of the upper or discharge end of the machine; Fig. 4 is a fragmental detail of the adjusting and locking devices for the outlet gate of the hopper; and Fig. 5 is a detail of the discharge spout of the tank.

In the embodiment of the invention shown in the drawings A represents the frame of the machine upon which are supported the tank B, which holds the smut removing solution, and the trunk C, up which the grain is carried from the tank. In the form shown in the drawings the tank B and the trunk C are made integral. Also supported on the frame A above the tank is a feed hopper D, having at the bottom an outlet opening adapted to be closed by a hinged gate 2, which, when closed, abuts against the floor or inclined bottom 3 of the hopper. This gate is operated by means of a bar 4 which is pivotally connected at 5 with the inner side of the gate, and which extends up through the hopper and terminates in a handle portion 6, resting intermediately upon a pin 7 projecting inwardly from the inner side of the hopper. As shown in the drawings the pin 7 is preferably in the form of a staple through which the operating bar 4 passes. On its under side the bar is formed with a row of rack teeth 8 which engage the pin 7 and thereby hold the bar in adjusted positions.

The trunk C is formed with side bars 9 on each side, between which are adjustably supported the frame members 10 of an endless carrier E, which passes over the sprockets 11 upon a shaft 15 journaled in the upper end of the carrier frame and the sprockets 12 journaled in the lower end of the frame. This carrier extends down into the forward end of the tank B, as will be seen from Fig. 1 of the drawings. It is operated by means of a chain 13 which passes over a sprocket wheel 14 upon the shaft 15, and a sprocket wheel 16 at the front of the machine. The sprocket wheel 16 is carried upon a shaft 17 which has an operating handle 18, whereby the carrier E is driven through the medium of the chain 13 and sprocket shaft 15.

It will be seen from Fig. 1 that the tank B extends out beyond the front wall 19 of the hopper and beyond the front members of the frame A. Within this forwardly projecting portion of the tank works a skimmer 20. The skimmer has a hub 21 which is keyed to a horizontal shaft 22 rotatable in bearing 23 secured upon the hopper. Also fast upon the shaft 22 is a bevel gear 24, which meshes with the gear 25 upon a horizontal shaft 26. This shaft is journaled upon, and extends transversely across, the front wall of the hopper, and carries at one end a sprocket wheel 27, which is operatively connected by means of a chain 28, with a sprocket 29 upon the operating shaft 17, by which the endless carrier E is driven. When this shaft is rotated the skimmer 20 will be revolved in a continuous rotary path across the front of the machine, sweeping the upper surface of the smut cleaning liquid and carrying the smut laterally out through the spout 30 to one side of the machine.

In order that the carrier may be adjusted up and down toward and away from the bottom wall or deck of the trunk C, the side bars 9 are formed with transverse slots 31 within which work pins 32 carried by the side members 10 of the carrier frame. These pins are provided with thumb nuts 33 whereby the carrier frame can be secured upon the side bars 9 of the trunk at the desired distance above the bottom or deck thereof.

In use the grain to be cleaned is put into the hopper D and the gate 2 adjusted and secured in such position as will give an outlet opening of the size desired, the tank B being filled of course with the smut removing solution. The grain will settle down onto the carrier E and the smut will rise to the top of the solution. When the crank 18 is turned, the grain will be swept up the deck or bottom of the trunk C, while the smut will be skimmed off the liquid in the tank and swept out at the side.

By having the skimmer working transversely across the forward extension of the tank and providing the tank with a lateral discharge spout, I am enabled materially to shorten the extension and make the machine more compact and convenient for use. With the skimmer working this way it does not occupy the whole width of the extension, as is the case with those working longitudinally. Furthermore, by mounting the sprockets 11 and 12 upon a carrier frame consisting of side bars which extend the entire length of the trunk, and by making the side bars adjustable by slot and pin connection toward and away from the trunk I am enabled to adjust the distance between the carrier and trunk uniformly and surely.

I claim as my invention:

In a smut machine, in combination, a feed hopper, a tank, a trunk extending upwardly and rearwardly from the tank, a carrier frame comprising side bars extending the entire length of the trunk and having slot and pin connection with the sides of the trunk, the slot being transverse to the longitudinal axis of the trunk whereby the frame can be adjusted toward or away from the deck of the trunk, and means for securing said frame in adjusted positions.

In testimony whereof I affix my signature in presence of two witnesses.

GUSTAV O. RUND.

Witnesses:
O. A. LEER,
J. B. MOE.

---

Copies of this patent may be obtained for five cents each, by addressing the "Commissioner of Patents, Washington, D. C."